US010931505B2

(12) United States Patent
Sekar et al.

(10) Patent No.: US 10,931,505 B2
(45) Date of Patent: Feb. 23, 2021

(54) SYSTEM AND METHOD FOR MULTI-TIER SYNCHRONIZATION (71) Applicant: Dropbox, Inc., San Francisco, CA (US)

(72) Inventors: Kiren R. Sekar, San Francisco, CA (US); Jack B. Strong, Austin, TX (US)

(73) Assignee: DROPBOX, INC., San Francisco, CA (US)

(*) Notice: Subject to any disclaimer, the term of this patent is extended or adjusted under 35 U.S.C. 154(b) by 0 days.

(21) Appl. No.: 16/230,291

(22) Filed: Dec. 21, 2018

(65) Prior Publication Data

US 2019/0132186 A1 May 2, 2019

Related U.S. Application Data (63) Continuation of application No. 14/826,144, filed on Aug. 13, 2015, now Pat. No. 10,177,960, which is a
(Continued)

(51) Int. Cl.
H04L 29/08 (2006.01)
G06F 11/16 (2006.01)
(Continued)

(52) U.S. Cl.
CPC ............ H04L 29/0854 (2013.01); G06F 3/06 (2013.01); G06F 3/065 (2013.01); G06F 3/067 (2013.01); G06F 3/0617 (2013.01); G06F 3/0619 (2013.01); G06F 11/1662 (2013.01); G06F 16/178 (2019.01); H04L 29/06 (2013.01);
(Continued)

(58) Field of Classification Search
None
See application file for complete search history.

(56) References Cited

U.S. PATENT DOCUMENTS 5,862,346 A 1/1999 Kley et al.
6,348,932 B1 2/2002 Nishikawa et al.
(Continued)

OTHER PUBLICATIONS

U.S. Appl. No. 12/383,693, dated Oct. 25, 2010, Office Action.
(Continued)

Primary Examiner — Angela Nguyen
(74) Attorney, Agent, or Firm — Keller Jolley Preece (57) ABSTRACT The present invention provides a System and method for multi-tiered data synchronization. Data is synchronized between a master synchronization server, one or more proxy synchronization servers, and client devices. Client devices establish synchronization sessions with either a proxy synchronization server or a master synchronization server, depending on which server provides the "best" available connection to that client device. Each proxy synchronization server synchronizes data with client devices that have established a synchronization session with such proxy synchronization server. The master synchronization server synchronizes data with client devices that have established a synchronization session with the master synchronization server. Each proxy synchronization server synchronizes data with the master synchronization server. Metadata associated with synchronized files is synchronized throughout the system in real-time. Files may be synchronized in real-time or of a delayed time.

20 Claims, 5 Drawing Sheets

Related U.S. Application Data continuation of application No. 12/383,693, filed on Mar. 26, 2009, now Pat. No. 9,141,483.

(60) Provisional application No. 61/072,008, filed on Mar. 27, 2008.

(51) Int. Cl.
*H04L 29/06* (2006.01)
*G06F 16/178* (2019.01)
*G06F 3/06* (2006.01)

(52) U.S. Cl.
CPC ...... *H04L 67/1095* (2013.01); *H04L 67/1097* (2013.01); *H04L 67/2814* (2013.01)

(56) References Cited

U.S. PATENT DOCUMENTS

| | | | |
|---|---|---|---|
| 6,407,750 B1 | 6/2002 | Gioscia et al. | |
| 6,636,873 B1 | 10/2003 | Carini et al. | |
| 6,636,888 B1 | 10/2003 | Bookspan et al. | |
| 6,904,185 B1 | 6/2005 | Wilkins et al. | |
| 7,039,723 B2 | 5/2006 | Hu et al. | |
| 7,103,357 B2 | 9/2006 | Kirani et al. | |
| 7,139,555 B2 | 11/2006 | Apfel | |
| 7,319,536 B1 | 1/2008 | Wilkins et al. | |
| 7,321,919 B2 | 1/2008 | Jacobs et al. | |
| 7,369,161 B2 | 5/2008 | Easwar et al. | |
| 7,372,485 B1 | 5/2008 | Bodnar et al. | |
| 7,441,180 B1 | 10/2008 | Kaczmarek et al. | |
| 7,502,795 B1 | 3/2009 | Svendsen et al. | |
| 7,576,752 B1 | 8/2009 | Benson et al. | |
| 7,680,067 B2 | 3/2010 | Prasad et al. | |
| 7,707,500 B2 | 4/2010 | Martinez | |
| 7,747,596 B2 | 6/2010 | Bigioi et al. | |
| 7,774,326 B2 | 8/2010 | Arrouye et al. | |
| 7,809,682 B2 | 10/2010 | Paterson et al. | |
| 7,882,502 B2 * | 2/2011 | Kovachka-Dimitrova | G06F 8/65 709/218 |
| 7,930,270 B2 | 4/2011 | Tsang | |
| 8,321,374 B2 | 11/2012 | Holt et al. | |
| 8,527,660 B2 * | 9/2013 | Prasad | H04L 67/1095 709/217 |
| 9,141,483 B1 | 9/2015 | Sekar et al. | |
| 2002/0013852 A1 | 1/2002 | Janik | |
| 2002/0044159 A1 | 4/2002 | Kuroiwa et al. | |
| 2002/0059604 A1 | 5/2002 | Papagan et al. | |
| 2002/0065848 A1 | 5/2002 | Walker et al. | |
| 2002/0066050 A1 | 5/2002 | Lerman et al. | |
| 2002/0099772 A1 | 7/2002 | Deshpande et al. | |
| 2002/0129096 A1 | 9/2002 | Mansour et al. | |
| 2003/0004952 A1 | 1/2003 | Nixon et al. | |
| 2003/0014478 A1 | 1/2003 | Noble | |
| 2003/0131098 A1 | 7/2003 | Huntington et al. | |
| 2003/0159136 A1 | 8/2003 | Huang et al. | |
| 2003/0218633 A1 | 11/2003 | Mikhail et al. | |
| 2004/0024979 A1 | 2/2004 | Kaminsky et al. | |
| 2004/0044732 A1 | 3/2004 | Fushiki et al. | |
| 2004/0088420 A1 | 5/2004 | Allen et al. | |
| 2004/0148207 A1 | 7/2004 | Smith et al. | |
| 2004/0148375 A1 | 7/2004 | Levett et al. | |
| 2005/0044164 A1 | 2/2005 | O'Farrell et al. | |
| 2005/0165869 A1 | 7/2005 | Huang et al. | |
| 2006/0052091 A1 | 3/2006 | Onyon et al. | |
| 2006/0156239 A1 | 7/2006 | Jobs et al. | |
| 2006/0242206 A1 | 10/2006 | Brezak et al. | |
| 2007/0005581 A1 | 1/2007 | Arrouye et al. | |
| 2007/0005707 A1 | 1/2007 | Teodosiu et al. | |
| 2007/0043830 A1 | 2/2007 | Housenbold et al. | |
| 2007/0156434 A1 | 7/2007 | Martin et al. | |
| 2007/0179989 A1 | 8/2007 | Maes | |
| 2007/0180075 A1 | 8/2007 | Chasman et al. | |
| 2007/0209005 A1 | 9/2007 | Shaver et al. | |
| 2007/0250645 A1 | 10/2007 | Meadows et al. | |
| 2007/0276836 A1 | 11/2007 | Chatterjee et al. | |
| 2008/0109448 A1 | 5/2008 | Aboel-Nil et al. | |
| 2008/0126936 A1 | 5/2008 | Williams | |
| 2008/0168185 A1 | 7/2008 | Robbin et al. | |
| 2008/0183800 A1 | 7/2008 | Herzog | |
| 2008/0208870 A1 | 8/2008 | Tsang | |
| 2009/0094252 A1 | 4/2009 | Wong et al. | |
| 2009/0125518 A1 | 5/2009 | Bailor | |
| 2009/0183060 A1 | 7/2009 | Heller et al. | |
| 2009/0187609 A1 | 7/2009 | Barton et al. | |
| 2009/0196311 A1 | 8/2009 | Khosravy | |
| 2010/0063670 A1 | 3/2010 | Brzezinski et al. | |
| 2015/0350004 A1 | 12/2015 | Sekar et al. | |

OTHER PUBLICATIONS

U.S. Appl. No. 12/383,693, dated Jul. 8, 2011, Office Action.
U.S. Appl. No. 12/383,693, dated May 15, 2014, Office Action.
U.S. Appl. No. 12/383,693, dated Oct. 8, 2014, Office Action.
U.S. Appl. No. 12/383,693, dated May 14, 2015, Notice of Allowance.
U.S. Appl. No. 14/826,144, dated Jun. 9, 2016, Office Action.
U.S. Appl. No. 14/826,144, dated Nov. 30, 2016, Office Action.
U.S. Appl. No. 14/826,144, dated Feb. 16, 2017, Office Action.
U.S. Appl. No. 14/826,144, dated Aug. 8, 2017, Office Action.
U.S. Appl. No. 14/826,144, dated Jan. 31, 2018, Office Action.
U.S. Appl. No. 14/826,144, dated Sep. 4, 2018, Notice of Allowance.

* cited by examiner

SYSTEM AND METHOD FOR MULTI-TIER SYNCHRONIZATION

CROSS REFERENCE TO RELATED APPLICATIONS

This application is a continuation of U.S. patent application Ser. No. 14/826,144, filed Aug. 13, 2015, which is a continuation of U.S. patent application Ser. No. 12/383,693, filed Mar. 26, 2009, now issued as U.S. Pat. No. 9,141,483, which claims the benefit of U.S. Provisional Application No. 61/072,008, filed on Mar. 27, 2008. Each of the aforementioned applications are hereby incorporated by reference in their entirety.

BACKGROUND OF THE INVENTION

1. Field of the Invention

This invention relates generally to synchronization/backup server systems, and more, specifically, to a method for multi-tier synchronization.

DESCRIPTION OF THE BACKGROUND ART

Real-time synchronization systems, including client-server solutions such as MICROSOFT EXCHANGE (email/PEVI) and SHARPCAST's first photo synchronization system, only synchronize data between a client and a server, where the client communicates with the server via the Internet. The advantage of client/server synchronization over the Internet is that the client device can access the server anytime it has an Internet connection. Also, by storing files on the server, the files can be easily recovered should the files on the client device be lost. There are at least two disadvantages with client/server synchronization over the Internet. Transferring files over the Internet is slower than transferring files over a local area network or an Intranet. Also, if a master server stores all synchronized files from many client devices, the master server has to have very large storage capabilities, which can be quite expensive.

An example of master server-client synchronization is described in U.S. patent application Ser. No. 11/269,498 titled "Method and Apparatus for a File Sharing and Synchronization System," and filed on Nov. 8, 2005 with first-named inventor Jack B. Strong, the contents of which are incorporated by reference as if fully disclosed herein.

Known multi-tier data management systems, such as web proxies, content delivery networks, or file replication technologies, such as "rsync," distribute file storage over the network. This means that client devices can retrieve files from intermediate sources instead of downloading then from a master server. Such intermediate sources may be connected to client devices over a local area network, where file transfers typically occur at a faster rate that transfers over the Internet. A disadvantage with known multi-tier data management systems is that data is not synchronized in real-time, which comprises user experience.

It would be desirable to have a synchronization System that was able to take advantage of the best of both multi-tier data management and client-server synchronization.

SUMMARY

The present invention provides a system and method for multi-tiered data synchronization. Data is synchronized between a master synchronization server, one or more proxy synchronization servers, and client devices.

Client devices establish synchronization sessions with either a proxy synchronization server or a master synchronization server, depending on which server provides the "best" available connection to that client device. "Best" means fastest, cheapest, or more secure, as per the client device's requirements. In one embodiment, client devices that can communicate with a proxy synchronization server over a local area network or intranet establish synchronization sessions with the proxy synchronization server instead of the master synchronization server.

Each proxy synchronization server synchronizes data with client devices "connected" to it (i.e., client devices that have established a synchronization session with the proxy synchronization server). The master synchronization server synchronizes data with client devices connected to it (i.e., client devices that have established a synchronization session with the master synchronization server via the Internet). Bach proxy synchronization server synchronizes data with the master synchronization server.

In the preferred embodiment, metadata associated with synchronized files or data objects is synchronized throughout the system in real-time. Files may be synchronized in real-time or at a delayed time.

DETAILED DESCRIPTION OF THE PREFERRED EMBODIMENTS

Figure 1:
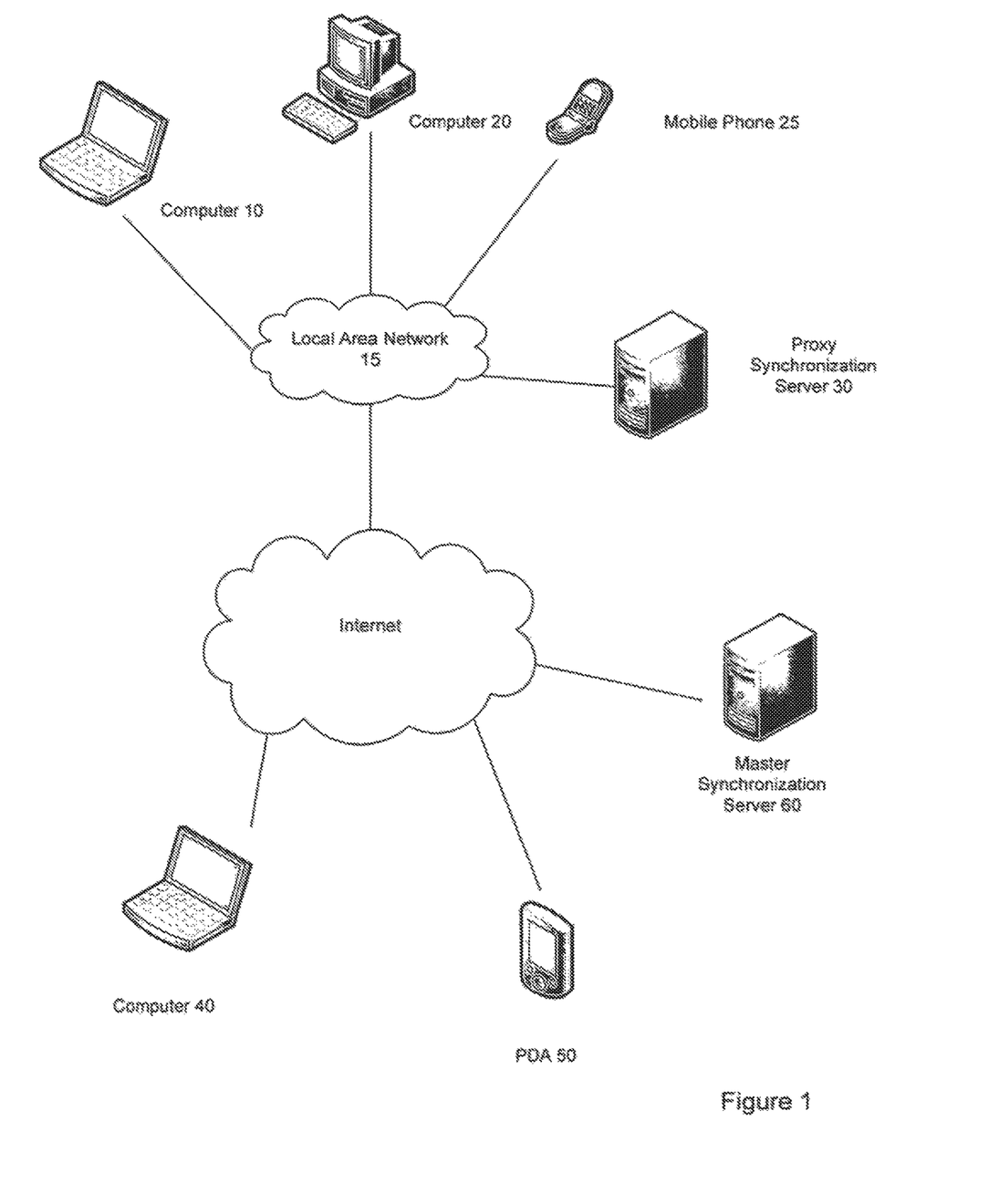
FIG. 1 is a block diagram that illustrates an example of a synchronization system.

The present invention provides a system and method for multi-tiered data synchronization. Data is synchronized between a "master" synchronization server, one or more "proxy" synchronization servers, and client devices. FIG. 1 is an example of a System 100 that includes a master synchronization server 60, a proxy synchronization server 30, and client devices 10, 20, 25, 40, and 50.

Master synchronization servers may, for example, be servers that are hosted in a data center and that are accessible via the Internet. Proxy synchronization servers may, for example, be included with Network Attached Storage (NAS) devices found in homes and offices, in media center or set top box systems found in home networks, in broadband routers found in home networks, and in dedicated appliances found in offices and home offices. Types of client devices include personal computers, mobile phones, PDAs, and other networked devices.

Figure 2:
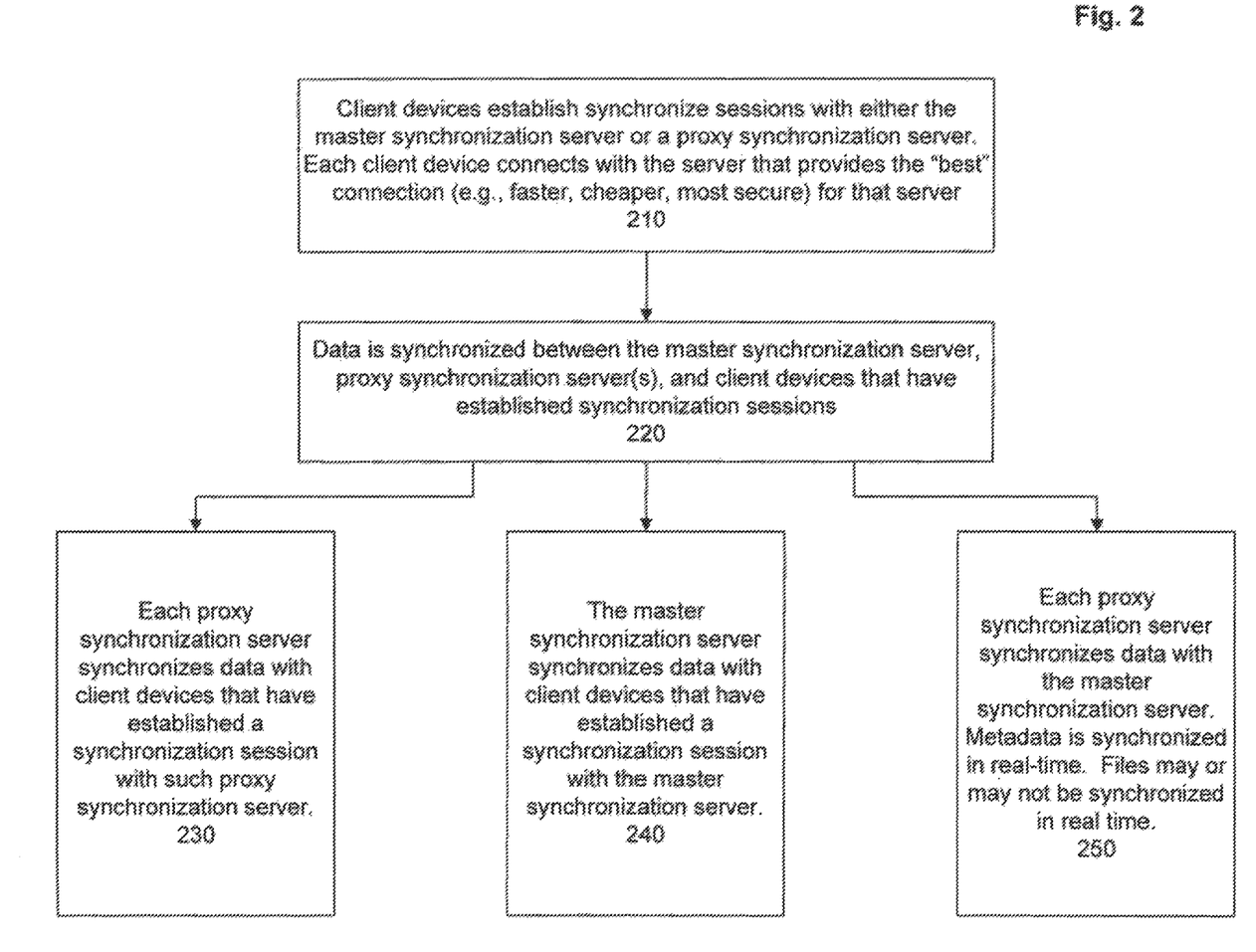
FIG. 2 illustrates a method for multi-tier synchronization.

FIG. 2 illustrates a method for multi-tiered data synchronization in a system that includes a master synchronization server, one or more proxy synchronization servers, and a plurality of client devices. Client devices establish synchronization sessions with either a proxy synchronization server or a master synchronization server, depending on which server provides the "best" available connection to that client device (step 210). "Best" means fastest, cheapest, or more secure, as per the client device's requirements.

In the preferred embodiment, client devices that can communicate with a proxy synchronization server over a local area network or intranet ("local client devices") establish synchronization sessions with the proxy synchronization server instead of the master synchronization server. Online client devices that are unable to communicate with the proxy synchronization server via a local area network or intranet ("remote client devices") establish synchronization sessions with a master synchronization server.

Consider for example, client device 10 in FIG. 1. Client device 10 could connect over the Internet to the master synchronization server, with a connection speed of several megabits per second, or it could connect to the proxy synchronization server 30 over the local area network 15 with a connection speed to up to a gigabit per second. Client device 10 would likely choose to connect to the proxy synchronization server 30. If client 10 is a mobile device that is taken to another location, it may no longer be able to connect to the proxy synchronization server 30 (for example, because the proxy synchronization server 30 is behind a firewall and is not accessible outside the user's home network). In this case, client device 10 would connect directly to the master server 60 via the Internet. In FIG. 1, client devices 40 and 50 are outside the local area network 15, and, thus, would establish synchronization sessions directly with the master synchronization server 60.

Referring again to FIG. 2, data is synchronized between the master synchronization server, the proxy synchronization server(s), and client devices (step 220). Each proxy synchronization server synchronizes data with client devices "connected" to it (i.e., client devices that have established a synchronization session with the proxy synchronization server, usually over a local network) (step 230). The master synchronization server synchronizes data with client devices connected to it (i.e., client devices that have established a synchronization session with the master synchronization server via the Internet) (step 240). Each proxy synchronization server synchronizes data with the master synchronization server (step 250).

Metadata associated with synchronized files is synchronized throughout the system in real-time. The master synchronization server stores all metadata associated with synchronized files/data objects in the system. Each client device and proxy synchronization server stores all metadata relevant to such device. Copies of synchronized files/data objects may be transferred along with the metadata or may be retrieved "on demand." The master server and the client devices may or may not store actual copies of synchronized files. However, in one embodiment, all files are backed up on to one or more of the proxy synchronization servers. In the preferred embodiment, files are synchronized in real-time between the proxy synchronization servers and interest client devices connected to it (i.e., client devices that have established a synchronization session with the proxy synchronization server). Similarly, in such embodiment, files are synchronized in real-time between the master synchronization server and interest client devices connected to it. Files may be synchronized between the master synchronization server and each proxy synchronization server either in real time or at a delayed time. In one embodiment, two devices (where client devices or a server) that have established a synchronization session between themselves maintain a dedicated connection to each other throughout the synchronization session, thereby enabling data (e.g., metadata, files, data objects) to be synchronized in real time.

Figure 3:
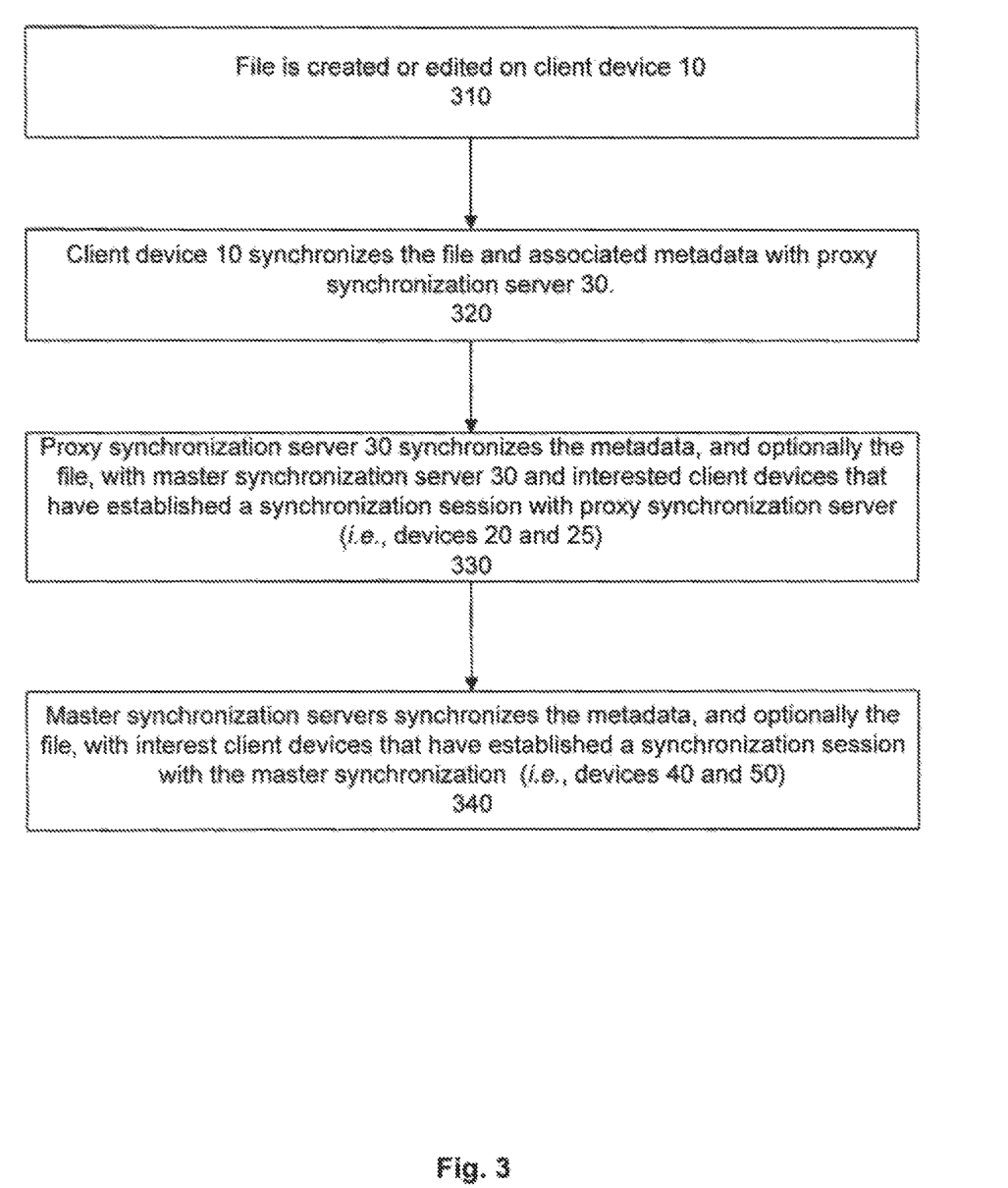
FIG. 3 illustrates an example of multi-tier synchronization.

FIG. 3 illustrates an example multi-tier synchronization scenario with respect to the system 100 illustrated in FIG. 1. In this example, client devices 10, 20, and 25 have each established a synchronization session with proxy synchronization server 30 via local area network 15, and client devices 40 and 50 have each established a synchronization session with master synchronization server 60 via the Internet. In the example, a file is created or edited on client device 10 (step 310). Client device 10 synchronizes the file and associated metadata with proxy synchronization server 30, which stores a back up copy of the file (step 320). The proxy synchronization server 30 synchronizes the metadata, and optionally the file, with master synchronization server 60 and interest client devices that are connected to the proxy synchronization server 30 (i.e., client device 20, 25) (step 330). The master synchronization server 60 then synchronizes the metadata, and optionally the file, with interest client devices connected to the master synchronization server 60 via the Internet (i.e., client devices 40, 50) (step 340). Metadata is preferably synchronized throughout the System 100 in real-time. Files can be synchronized in real time or at a delayed time.

Figure 4:
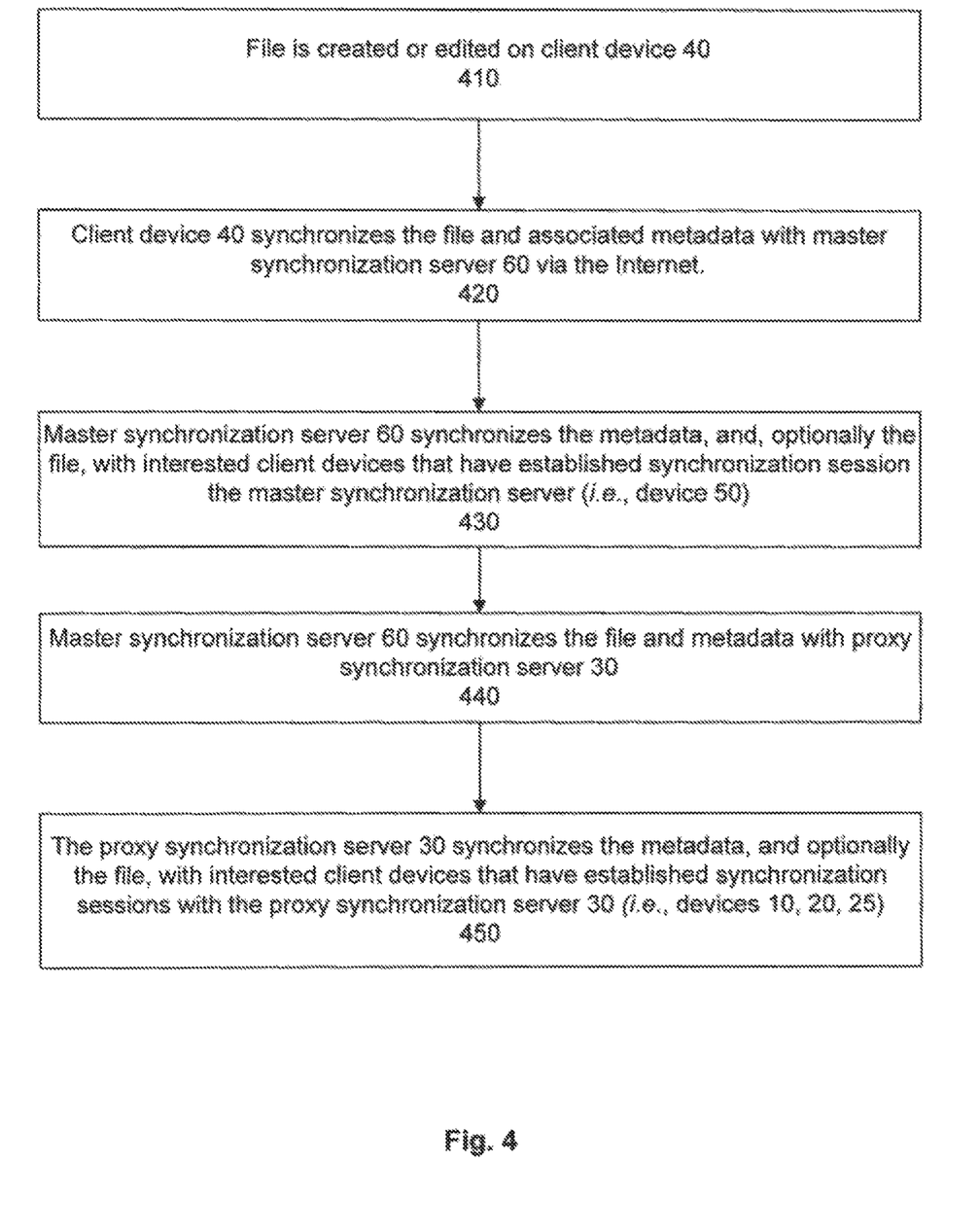
FIG. 4 illustrates another example of multi-tier synchronization.

FIG. 4 illustrates another example scenario, in which a file is created or edited on client device 40 (step 410). The client device 40 synchronizes the file and associated metadata with master synchronization server 60 via the Internet (step 420). The master synchronization server 60 synchronizes the metadata, and optionally the file, with interested client devices that have established a synchronization session with the master synchronization server (i.e., client device 50) (step 430). The master synchronization server also synchronizes the file and metadata with the proxy synchronization server 30 (step 440), and the proxy synchronization server 30 synchronizes the metadata, and optionally the file, with interested client devices that have established synchronization sessions with the proxy synchronization server 30 (i.e., client devices 10, 20, 25) (step 450). As discussed in more detail below, the master synchronization server may store a copy of file, or it may simply pass the file on to the proxy synchronization server 30, which stores a back up copy of the file. Metadata is preferably synchronized throughout the System 100 in real time. Files may be synchronized in real-time or at a delayed time.

Figure 5:
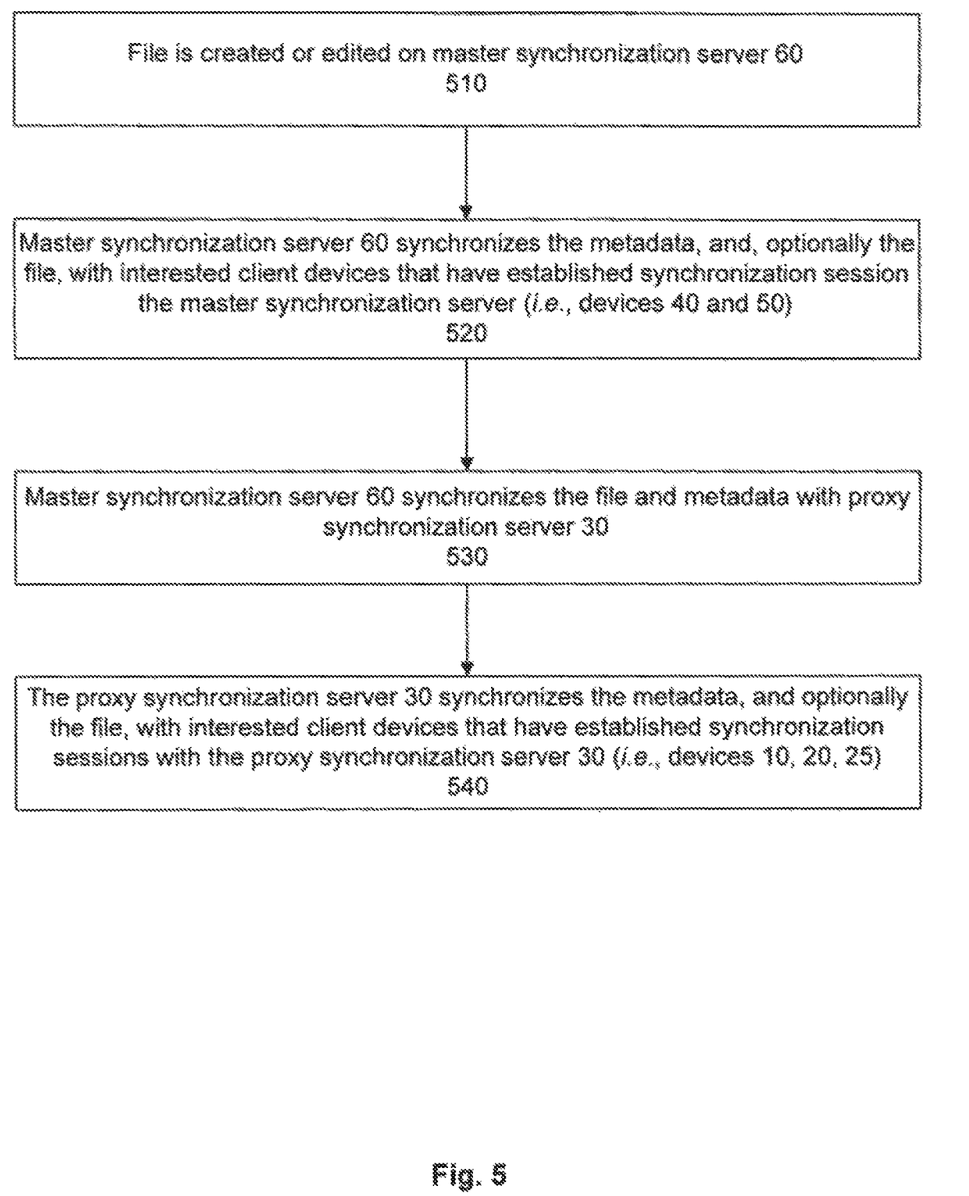
FIG. 5 illustrates a further example of multi-tier synchronization.

FIG. 5 illustrates another example scenario with respect to the system 100 illustrated in FIG. 1. In this example, a file is created or edited on master server 60 via a web interface (step 510). The master synchronization server 60 synchronizes the metadata, and optionally the file, with interested client devices that have established a synchronization session with the master synchronization server 60 (i.e., client devices 40 and 50) (step 520). The master synchronization server 60 also synchronizes the file and metadata with the proxy synchronization server 30 (step 530), and the proxy synchronization server 30 synchronizes the metadata, and optionally the file, with interested client devices that have established synchronization sessions with the proxy synchronization server 30 (i.e., client devices 10, 20, 25) (step 540). As discussed in more detail below, the master synchronization server may store a copy of file, or it may simply pass the file on to the proxy synchronization server 30, which stores a back up copy of the file. Metadata is preferably synchronized throughout the System 100 in real time. Files may be synchronized in real-time or of a delayed time.

The multi-tiered synchronization method of the present invention can be used to more effectively utilize network bandwidth than traditional client-server architectures. Multi-tier synchronization can be configured to utilize less bandwidth over the Internet during peak usage hours, when that connection may be in high demand by other applications. For example, a client device may synchronize a new file to a proxy synchronization server. This transfer may happen at a high bitrate, as it is likely over a local area network, or high speed intranet. The proxy synchronization server makes this file immediately available to other client devices connected to the proxy synchronization server. The file is backed up on the proxy synchronization server, and, thus, if the client device's hard disk fails, the file can be restored from the proxy. However, the proxy synchronization server need not synchronize the file to the master synchronization server immediately. It could defer syncing the file until the Internet connection (which is often slower and more contentious than the connection from the local client devices to the proxy synchronization server) until an idle period (e.g., the middle of the night). Alternately, the proxy synchronization server may sync files with the master synchronization server throughout the day, but only use a low percentage of Internet bandwidth while other applications require bandwidth, and a high percentage when the Internet connection is idle. Despite this variable bandwidth synchronization to the master synchronization server over the Internet, the proxy synchronization server is able to synchronize files at a high speed to client devices connected to the proxy synchronization server.

In the preferred embodiment, metadata is synchronized in real-time, even if files may be synchronized on a deferred schedule. Since metadata takes very little bandwidth to synchronize, metadata changes can be synchronized up from the proxy synchronization server to the master synchronization server in real time, providing all clients with up-to-date metadata. This can, for example, prevent clients from making conflicting changes to a file even if that file has not been synchronized to the master synchronization server (pending an idle period), since the file's revision information can be described in metadata.

In one embodiment, conflict resolution is employed hierarchically. A conflict resolution algorithm can be applied on the proxy synchronization server when conflicting changes are synced to it, or on the master synchronization server when receiving conflicting changes from any combination of proxies or directly connected clients.

File storage requirements on the master synchronization server may be minimized by relying on proxy synchronization servers to back up files. In one embodiment, the master synchronization server stores only metadata and no files. In an alternate embodiment, the master synchronization server stores only select files. For example, the proxy synchronization server could store all versions of a file, and the master synchronization server could store only the most recent version of a file. As another example, the master synchronization server could store only files having a specific tag or rating (music files rated with 5 stars). As yet another example, the master synchronization server could store only files of a certain media type (e.g., photo files, music files).

In one embodiment, client devices will first attempt to synchronize with a proxy synchronization server if that Option is available. If a proxy synchronization server is not available for synchronization, then, in such embodiment, the client device will synchronize with a peer client device if a peer client device is available for synchronization. If neither a proxy synchronization server nor a peer client device is available for synchronization, then the client device will synchronize with the master synchronization server. Peer-to-peer synchronization is described in U.S. Patent Application titled "Opportunistic Peer-to-Peer Synchronization in a Synchronization System" filed on Mar. 24, 2009 and having inventors Kiren R. Sekar and Jack B. Strong, the contents of which are incorporated herein by reference as if fully disclosed herein.

Examples of files include photos, music files, word processing documents, spreadsheets, slide presentations, and video files.

The methods disclosed herein can be used to synchronize data objects, such as email messages, text messages, contact items, and calendar items, in the same way that files are synchronized.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method comprising:
   providing, by a synchronization server and to a first client device, access to a file associated with metadata, wherein the file and the metadata are stored on the synchronization server;
   receiving, by the synchronization server, updated metadata corresponding to the file based on edits made to the file on the first client device; and
   prior to receiving an edited version of the file from the first client device:
      associating the updated metadata with the file on the synchronization server;
      receiving, from a second client device, an edit request comprising changes to the file stored on the synchronization server; and
      preventing the changes to the file based on the updated metadata corresponding to the file.

2. The method of claim 1, further comprising comparing revision information within the edit request from the second client device with updated revision information within the updated metadata corresponding to the file.

3. The method of claim 2, wherein preventing the changes to the file based on the updated metadata comprises determining the revision information within the edit request is different than the updated revision information within the updated metadata.

4. The method of claim 1, further comprising receiving the edited version of the file from the first client device after preventing the changes within the edit request from the second client device.

5. The method of claim 4, further comprising:
   storing the edited version of the file associated with the updated metadata corresponding to the file on the synchronization server; and
   enabling the second client device to change the edited version of the file.

6. The method of claim 4, wherein:
   receiving the updated metadata from the first client device is in response to the edits being made to the file on the first client device; and
   receiving the edited version of the file from the first client device is delayed based on a characteristic of a connection between the first client device and the synchronization server.

7. The method of claim 6, wherein the characteristic comprises available bandwidth for the connection between the first client device and the synchronization server.

8. A non-transitory computer readable medium storing instructions that, when executed by at least one processor, cause a synchronization server to:

provide, by the synchronization server and to a first client device, access to a file associated with metadata, wherein the file and the metadata are stored on the synchronization server;

receive, by the synchronization server, updated metadata corresponding to the file based on edits made to the file on the first client device; and prior to receiving an edited version of the file from the first client device:
- associate the updated metadata with the file on the synchronization server;
- receive, from a second client device, an edit request comprising changes to the file stored on the synchronization server; and
- prevent the changes to the file based on the updated metadata corresponding to the file.

9. The non-transitory computer readable medium of claim 8, further comprising instructions that, when executed by the at least one processor, cause the synchronization server to compare revision information within the edit request from the second client device with updated revision information within the updated metadata corresponding to the file.

10. The non-transitory computer readable medium of claim 9, wherein preventing the changes to the file based on the updated metadata comprises determining the revision information within the edit request is different than the updated revision information within the updated metadata.

11. The non-transitory computer readable medium of claim 8, further comprising instructions that, when executed by the at least one processor, cause the synchronization server to receive the edited version of the file from the first client device after preventing the changes within the edit request from the second client device.

12. The non-transitory computer readable medium of claim 11, further comprising instructions that, when executed by the at least one processor, cause the synchronization server to:
- store the edited version of the file associated with the updated metadata corresponding to the file on the synchronization server; and
- enable the second client device to change the edited version of the file.

13. The non-transitory computer readable medium of claim 11, wherein:
- receiving the updated metadata from the first client device is in response to the edits being made to the file on the first client device; and
- receiving the edited version of the file from the first client device is delayed based on a characteristic of a connection between the first client device and the synchronization server.

14. The non-transitory computer readable medium of claim 13, wherein the characteristic comprises available bandwidth for the connection between the first client device and the synchronization server.

15. A system comprising:
at least one processor; and
a non-transitory computer readable medium storing instructions that, when executed by the at least one processor, cause the system to:
- provide, by a synchronization server and to a first client device, access to a file associated with metadata, wherein the file and the metadata are stored on the synchronization server;
- receive, by the synchronization server, updated metadata corresponding to the file based on edits made to the file on the first client device; and
- prior to receiving an edited version of the file from the first client device:
  - associate the updated metadata with the file on the synchronization server;
  - receive, from a second client device, an edit request comprising changes to the file stored on the synchronization server; and
  - prevent the changes to the file based on the updated metadata corresponding to the file.

16. The system of claim 15, further comprising instructions that, when executed by the at least one processor, cause the system to compare revision information within the edit request from the second client device with updated revision information within the updated metadata corresponding to the file.

17. The system of claim 16, wherein preventing the changes to the file based on the updated metadata comprises determining the revision information within the edit request is different than the updated revision information within the updated metadata.

18. The system of claim 15, further comprising instructions that, when executed by the at least one processor, cause the system to receive the edited version of the file from the first client device after preventing the changes within the edit request from the second client device.

19. The system of claim 18, further comprising instructions that, when executed by the at least one processor, cause the system to:
- store the edited version of the file associated with the updated metadata corresponding to the file on the synchronization server; and
- enable the second client device to change the edited version of the file.

20. The system of claim 18, wherein:
receiving the updated metadata from the first client device is in response to the edits being made to the file on the first client device; and
receiving the edited version of the file from the first client device is delayed based on a characteristic of a connection between the first client device and the synchronization server.

* * * * *